United States Patent [19]

Ekstrom et al.

[11] 4,285,196

[45] Aug. 25, 1981

[54] WAVE POWER GENERATOR

[76] Inventors: James R. Ekstrom, 5537 Blossom Vista Ave., San Jose, Calif. 95124; Howard B. Ekstrom, 7 Francisco Dr., Pompton Plains, N.J. 07444

[21] Appl. No.: 95,016

[22] Filed: Nov. 16, 1979

[51] Int. Cl.³ .............................................. F03B 13/12
[52] U.S. Cl. ....................................... 60/499; 60/500; 60/501; 60/504; 60/505; 60/507; 60/698
[58] Field of Search ................................. 60/495–507, 60/698; 290/53

[56] References Cited

U.S. PATENT DOCUMENTS

| | | | |
|---|---|---|---|
| 460,371 | 9/1891 | Dyer | 60/507 X |
| 968,930 | 8/1910 | Fuchs | 60/507 X |
| 1,256,106 | 2/1918 | Callaway | 60/507 X |
| 3,297,300 | 1/1967 | Mountanos | 60/504 X |

*Primary Examiner*—Allen M. Ostrager
*Attorney, Agent, or Firm*—Townsend and Townsend

[57] ABSTRACT

Apparatus for deriving power output from wave energy is disclosed. A rotatable member is provided which is capable of rotating in only one direction. A float is provided which rises and falls in response to wave action, and thereby moves relative to the rotatable member. The float is coupled to the rotatable member so that the movement of the float rotates the rotatable member in its available direction to provide power output.

In its preferred form, the present invention provides an elongate floating barge flanked by a pair of elongate floats. Transverse movement of the floats relative to the barge is limited. A rotatable power output shaft is mounted on the barge parallel to the elongate floats. A plurality of pulleys circumscribe the shaft and are spaced along its length. Tension members attached to the floats circumscribe the respective pulleys to rotate the pulleys and thereby the shaft as the floats move relative to the barge to achieve power output.

20 Claims, 4 Drawing Figures

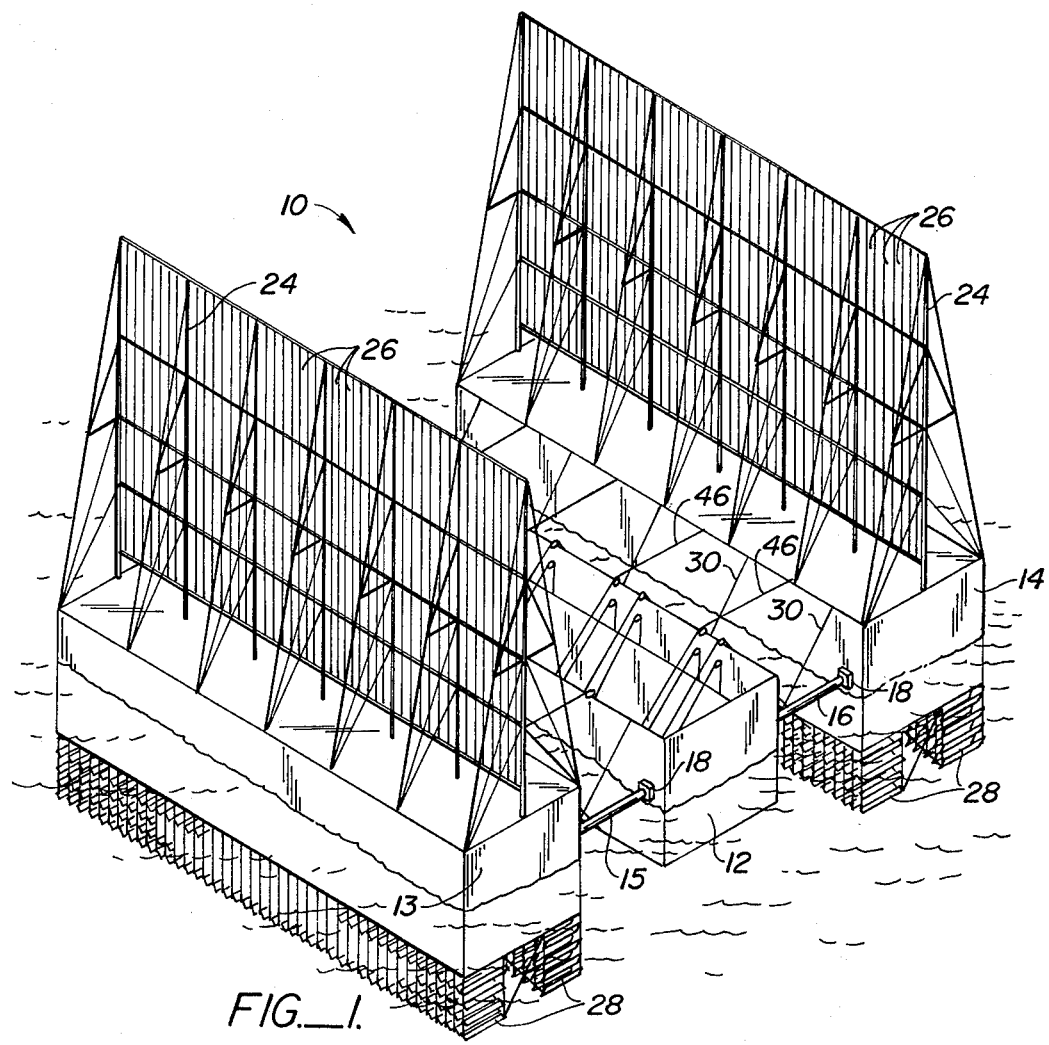
FIG._1.
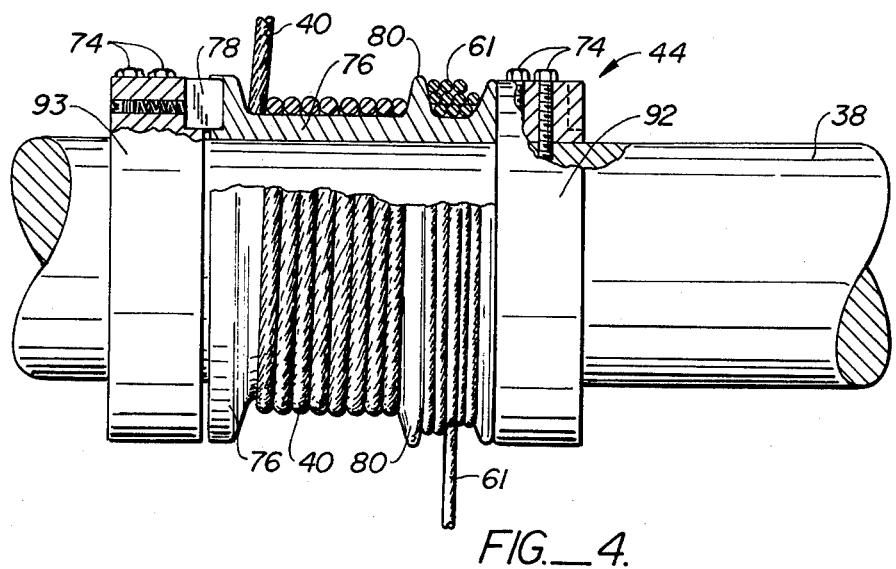
FIG._4.

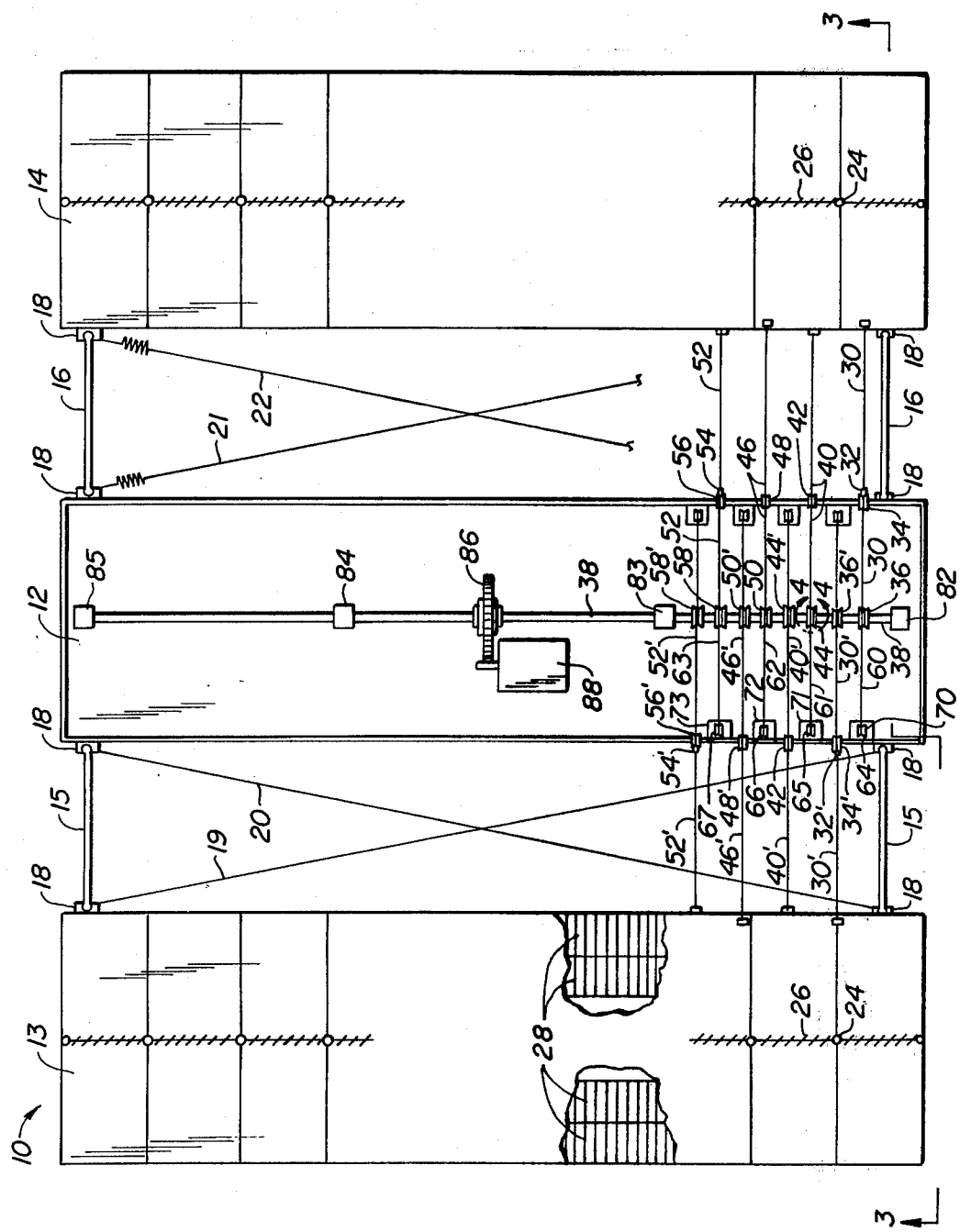
FIG._2.

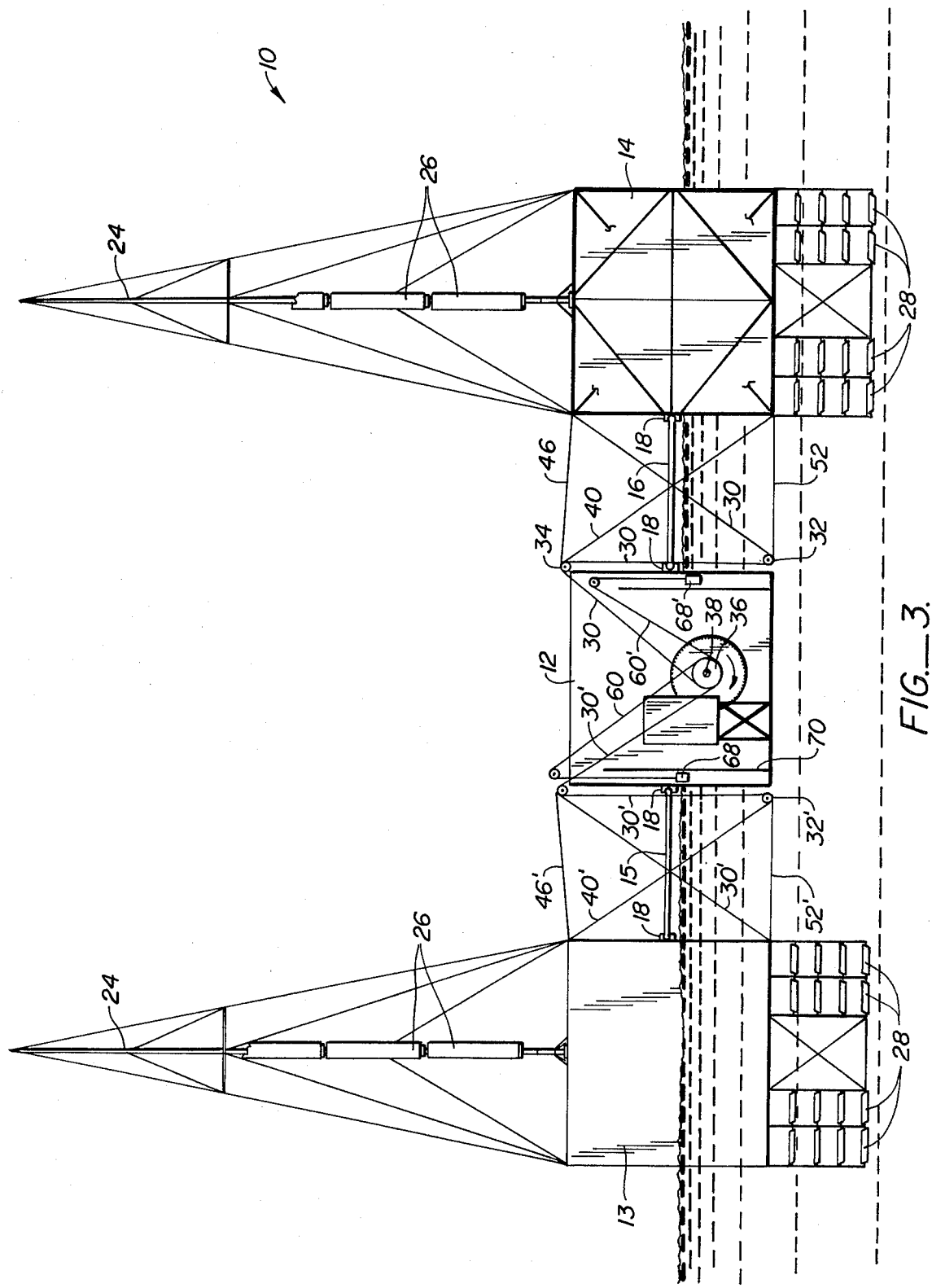
FIG._3.

WAVE POWER GENERATOR

BACKGROUND OF THE INVENTION

The present invention provides a power generator which utilizes the energy of wave action, and to a lesser degree wind and current action, to achieve power output.

The rapid depletion and decreased availability of fossil fuels has generated a great deal of interest in alternate sources of energy. Moreover, after experience with an energy resource which can be depleted, sources of energy are being investigated which are continuous in nature, and not subject to depletion. Primarily, such interest is centered on solar energy and wind energy. However, another source of such energy, which has received little meaningful attention, is wave energy.

The present invention provides apparatus for deriving power output from wave energy. A rotatable member is provided which is capable of rotating in only one direction. A float is provided which rises and falls in response to wave action, and thereby moves relative to the rotatable member. The float is coupled to the rotatable member so that the movement of the float rotates the rotatable member in its available direction to provide power output.

In its preferred form, the present invention provides an elongate floating barge flanked by a pair of elongate floats. Transverse movement of the floats relative the barge is limited. A rotatable power output shaft is mounted on the barge parallel to the elongate floats. A plurality of pulleys circumscribe the shaft and are spaced along its length. Tension members attached to the floats circumscribe the respective pulleys to rotate the pulleys and thereby the shaft as the floats move relative to the barge to achieve power output.

In the present invention, the plurality of tension members can be connected to the pulleys along different paths so that various movements of the float all cause rotation of the shaft in its desired direction. Specifically, not only can the up and down motion of the floats generated by the waves be utilized, but their rocking motion can be utilized as well.

In the preferred embodiment of the present invention, wind and current vanes are used to aid in the rocking of the floats. Since the present invention, in its preferred form, utilizes the rocking motion of the floats as well as their up and down motion to generate power output, these alternate energy sources act as a bonus.

The present invention provides an efficient and direct mechanism for transforming wave action into shaft rotation, which can be used to generate different types of power, usually electrical. A secondary advantage of the present invention is that it can be constructed to a large extent from existing surplus materials. Specifically, the floats used in the present invention can comprise ships which are no longer in service. The barge can be an existing barge suitable for carrying the power shaft and a generator operated by the shaft. As a result, it is contemplated that the present invention can be implemented at relatively minor cost.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the preferred embodiment of the present invention;

FIG. 2 is a plan view of the embodiment of FIG. 1;

FIG. 3 is an elevation view taken along lines 3—3 of FIG. 1;

FIG. 4 is a fragmentary sectional view of one of the pulleys of the embodiment of FIG. 1.

DESCRIPTION OF THE PREFERRED EMBODIMENT

The preferred embodiment 10 of the wave power generator of the present invention is illustrated by way of reference to FIGS. 1-3 in combination. A central barge 12 is mounted between two elongate floats 13, 14. It is contemplated that floats 13, 14 can constitute ships which are no longer in service.

Floats 13, 14 are connected to barge 12 by pins 15, 16 respectively. Pins 15, 16 have balls at the end which engage sockets 18 mounted on the floats and the barge. A pair of bungee ropes 19, 20 interconnect the ends of barge 12 and float 13, as illustrated in FIG. 2. A similar pair of bungee ropes 21, 22 interconnect the ends of barge 12 and float 14. The bungee ropes together with pins 15, 16 allow the floats to move vertically relative to barge 12 and rock from side to side but limit the transverse movement of the floats relative to the barge.

Each float 13, 14 has a mast structure 24 which supports a plurality of wind vanes 26. Wind vanes 26 are cycled between a closed position, in which the vanes in combination provide a flat surface, and an open position in which the vanes are parallel. Floats 13, 14 are adapted to be aligned perpendicular to the wind. Accordingly, when wind vanes 26 are closed, they will provide a flat surface to the wind, and the wind will rock the boat in a downwind direction. When vanes 26 are opened to allow the wind to pass between the vanes, the floats will rock to windward. The opening and closing of wind vanes 26 is cycled to achieve a resonance effect to maximize the rocking of the floats.

A plurality of current vanes 28 are provided under each float 13, 14. Floats 13, 14 are adapted to be aligned parallel to the direction of any current flow in the flotation medium. Current vanes 28 on each float 13, 14 are divided into sets on opposite sides of the float. Vanes 28 are cycled alternately so that the current causes a rocking motion of floats 13, 14. The cycling of current vanes 28 is coordinated with that of wind vanes 26 to achieve a maximum rocking action of floats 13, 14.

A plurality of tension members, typically cables or chains, extend from each float 13, 14 to barge 12. A first tension member 30 extends from the top of the hull of float 14, passes beneath an idler pulley 32 located at the bottom of barge 12, upwardly along the side of barge 12, and over an idler pulley 34 at the top of the barge. From idler pulley 34, tension member 30 passes downwardly into barge 12 and around a pulley 36 mounted on a rotatable shaft 38 within the barge. A second tension member 40 is attached to the hull of float 14 at its bottom, passes upwardly to an idler pulley 42 at the upper edge of barge 12, and downwardly into the barge, wrapping around pulley 44 on shaft 38.

A third tension member 46 is attached to the top of the hull of float 14, passes over an idler pulley 48 at the top of barge 12, and wraps around pulley 50 on shaft 38. A fourth tension member 52 runs from the bottom of the hull of float 14, around an idler pulley 54 at the bottom of barge 12, over a second idler pulley 56 at the top of the barge, and around pulley 58 on shaft 38.

In order to maintain tension members 30, 40, 46 and 52 in tension, cables 60-63 pass around pulleys 36, 44, 50, 54 respectively in the same direction as the associated tension members. Cables 60-63 pass over idler pulleys 64-67 and weights such as 68 are suspended therefrom in channels 70-73.

The pattern of cables 30, 40, 46, 52 is repeated along the entire length of barge 12 and float 14. In each set, the tension members pass from the float 14 to barge 12 along different paths, and from different vertical positions on the float. Accordingly, as float 14 moves vertically relative to barge 12 as a result of wave action, and rocks back and forth as a result of combined wave, wind and current action, all of this relative movement causes tension members 30, 40, 46 and 52 to rotate their associated pulleys.

Corresponding sets of tension members pass between float 13 and barge 12, and pass around pulleys mounted on shaft 38. For convenience, these tension members, pulleys and associated elements are given prime numbers corresponding to their mirror image elements associated with float 14. Accordingly, vertical movement and rocking motion of float 13 also results in an extension and contraction of the tension members attached thereto relative to their associated pulleys on shaft 38.

A typical pulley arrangement 44 is illustrated by way of reference to FIG. 4. A pair of collars 92, 93 are fixed to shaft 38 by screws 74. A spool 76 is located between collars 92, 93 and is rotatable with respect to shaft 38. Spool 76 is connected to collar 93 by a pawl and ratchet assembly 78 which provides a one-way clutch. That is, when spool 76 is rotated in one direction, pawl and ratchet 78 force shaft 38 to rotate with the spool. However, spool 76 is really rotatable relative to shaft 38 in the opposite direction.

A divider 80 is provided on spool 76. Tension member 40 is wrapped around one portion of spool 76, and the end of tension member 40 is welded to the spool. Weighted cable 61 is wrapped around spool 76 in the same direction as tension member 40.

Shaft 38 is controlled so that it is rotatable in only one direction. Tension member 40 is wrapped around spool 76 in the direction that will cause the spool to rotate in the rotatable direction of shaft 38 when it is under tension. Pawl and ratchet 78 provides a connection between the spool and the shaft in this direction. Weighted cable 61 provides a biasing force on spool 76 tending to rotate it in the opposite direction from tension member 40, and thus maintains tension member 40 in continuous tension. All of the pulleys are generally similar in construction to pulley 44.

Referring back to FIGS. 1-3, shaft 38 is mounted using a plurality of bearings 82-85. Although not explicitly shown in the drawings, the pulleys and their associated tension members are located along the entire length of shaft 38. A fly wheel 86 is mounted at the center of shaft 38 and connects to electrical generator 38. The continuous rotation of shaft 38 caused by the movement of the tension members is transmitted through fly wheel 86 to generator 88 to generate electrical power.

While a preferred embodiment of the present invention has been illustrated in detail, it is apparent that modifications and adaptations of that embodiment will occur to those skilled in the art. For example, various arrangements of tension members, pulleys and the like could be used to achieve the object of the present invention. However, it is to be expressly understood that such modifications and adaptations are within the spirit and scope of the present invention, as set forth in the following claims.

What is claimed is:

1. Apparatus for deriving power output from wave action comprising:
   a rotatable member capable of rotating only in one direction;
   a float which rises and falls in response to wave action and thereby moves relative to the rotatable member;
   means mounted on said float for rocking the float in the presence of wind; and
   means for coupling the float to the rotatable member so that movement of and rocking of the float both rotate the rotatable member in said one direction.

2. Apparatus for deriving power output from wave action comprising:
   a rotatable member capable of rotating only in one direction;
   a float which rises and falls in response to wave action and thereby moves relative to the rotatable member;
   means mounted to said float for rocking the float in response to a current in the floating medium; and
   means for coupling the float to the rotatable member so that movement of and rocking of the float both rotate the rotatable member in said one direction.

3. The apparatus of claim 1 or 2 wherein said coupling means comprises a pulley circumscribing the rotatable member, a ratchet and pawl coupling the pulley to the rotatable member so that movement of the pulley in said one direction causes corresponding rotation of the rotatable member, the pulley being freely rotatable relative to the rotatable member in the other direction, and a tension member attached to the float and circumscribing the pulley so that movement of the float relative to the rotatable member causes rotation of the pulley.

4. The apparatus of claim 2 wherein said coupling means additionally comprises a weighted cable adapted to rotate said pulley in said other direction to maintain tension in said tension member.

5. The apparatus of claim 1 or 2 wherein the position of the rotatable member is fixed.

6. The apparatus of claim 1 wherein the rotatable member is mounted on a floating barge separate from said float.

7. The apparatus of claim 1 or 2 wherein said coupling means comprises means for coupling the float to the rotatable member along a plurality of coupling paths so that movement of the float in various directions and about various axes rotates the rotatable member in said one direction.

8. Apparatus for deriving power output from wave action comprising:
   an elongate floating barge;
   a pair of elongate floats flanking said barge, the axes of the floats being parallel to that of the barge;

means for limiting transverse movement without substantially inhibiting vertical translation, rotation and pitch of the floats relative to the barge;

a shaft mounted on said barge so that the axis of the shaft is generally coincident with or parallel to that of the barge, said shaft being rotatable in only one direction;

a plurality of pulleys circumscribing the shaft and spaced along its length, said pulleys being coupled with the shaft so that rotation of the pulleys in said one direction causes corresponding rotation of the shaft, said pulleys being rotatable relative to the shaft in said opposite direction; and a plurality of tension members attached to each float and circumscribing the respective pulleys to cause rotation of the pulleys responsively to movement of the floats.

9. The apparatus of claim 8 wherein the tension members emanate from different vertical positions on the floats.

10. The apparatus of claim 9 wherein the tension members connect to the pulleys along a variety of paths so that various types of movement of the floats relative to the barge cause different movements of the various tension members.

11. The apparatus of claim 8 wherein the floats include wind vanes which are movable to alternately catch and bypass the wind to cause a rocking motion of the floats.

12. The apparatus of claim 8 wherein the floats include a plurality of depending current vanes movable to alternately catch and bypass a current in the floating medium to cause a rocking motion of the floats.

13. The apparatus of claim 8 and additionally comprising weights attached to the pulleys to provide a continuous tension on the tension members.

14. The apparatus of claim 8 wherein the shaft is coupled to a generator to produce electric power.

15. Apparatus for deriving power output from wave action comprising:

an elongate floating barge an elongate float flanking said barge, the axis of the float being parallel to that of the barge;

a pair of transversely spaced rigid members interconnecting the barge and the float and attached to the barge and floats with universal joints at intermediate vertical positions on both the barge and the float so that the barge and float are substantially free to move vertically, rotate and pitch relative to one another;

a shaft mounted on said barge so that the axis of the shaft is generally coincident with or parallel to that of the barge, said shaft being rotatable in only one direction;

a plurality of pulleys circumscribing the shaft and spaced along its length, said pulleys being coupled with the shaft so that rotation of the pulleys in said one direction causes corresponding rotation of the shaft, said pulleys being rotatable relative to the shaft in said opposite direction; and a plurality of tension members attached to the float at vertical positions above and below the attachment of the rigid members and circumscribing the respective pulleys to cause rotation of the pulleys responsively to movement of the float.

16. The apparatus of claim 15 wherein the tension members connect to the pulleys along a variety of paths so that various types of movement of the float relative to the barge cause different movements of the various tension members.

17. The apparatus of claim 15 wherein the floats include wind vanes which are movable to alternately catch and bypass the wind to cause a rocking motion of the floats.

18. The apparatus of claim 15 wherein the floats include a plurality of depending current vanes movable to alternately catch and bypass a current in the floating medium to cause a rocking motion of the floats.

19. The apparatus of claim 15 wherein the shaft is coupled to a generator to produce electric power.

20. The apparatus of claim 15 and additionally comprising a second said float similar to the first and located on the opposite side of the barge from the first float.

* * * * *